United States Patent
Nohara et al.

(10) Patent No.: US 6,546,258 B1
(45) Date of Patent: Apr. 8, 2003

(54) COMMUNICATION APPARATUS AND COMMUNICATION METHOD

(75) Inventors: Manabu Nohara, Tsurugashima (JP); Yasuteru Kodama, Tsurugashima (JP); Masami Suzuki, Tsurugashima (JP); Masahiro Okamura, Tsurugashima (JP); Takayuki Akimoto, Tsurugashima (JP); Osamu Yamazaki, Tsurugashima (JP); Takehiko Shioda, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 349 days.

(21) Appl. No.: 09/639,888

(22) Filed: Aug. 17, 2000

(30) Foreign Application Priority Data

Aug. 20, 1999 (JP) ............................................. 11-233417

(51) Int. Cl.[7] ............................................. H04B 15/00
(52) U.S. Cl. ...................... 455/456; 375/142; 375/145; 455/440
(58) Field of Search ............................. 455/440, 621, 455/422, 456, 550, 575; 375/140, 343, 141, 142, 145; 370/328, 329, 330, 331, 332, 333, 334, 335

(56) References Cited

U.S. PATENT DOCUMENTS

| | | | |
|---|---|---|---|
| 4,214,209 A | * 7/1980 | Baier et al. ..................... 375/1 |
| 4,550,414 A | * 10/1985 | Guinon et al. .................. 375/1 |
| 5,235,633 A | 8/1993 | Dennison et al. .............. 379/60 |
| 5,508,708 A | 4/1996 | Ghosh et al. ................ 342/457 |
| 5,802,121 A | * 9/1998 | Hiramatsu ................... 375/368 |
| 5,910,948 A | * 6/1999 | Shou et al. .................. 370/335 |
| 5,995,537 A | * 11/1999 | Kondo ......................... 375/208 |
| 6,018,667 A | * 1/2000 | Ghosh et al. ................ 455/502 |
| 6,038,250 A | * 3/2000 | Shou et al. .................. 375/206 |
| 6,144,691 A | * 11/2000 | Kenney ....................... 375/130 |
| 6,226,315 B1 | * 5/2001 | Sriram et al. ................ 375/140 |
| 6,363,049 B1 | * 3/2002 | Chung ......................... 370/210 |
| 6,385,232 B1 | * 5/2002 | Terashima ................... 375/149 |

FOREIGN PATENT DOCUMENTS

WO        WO 99/27657        6/1999

* cited by examiner

Primary Examiner—Thanh Cong Le
Assistant Examiner—James D Ewart
(74) Attorney, Agent, or Firm—Morgan, Lewis & Bockius LLP

(57) ABSTRACT

A communication apparatus for communicating with one base station among a plurality of base stations is provided with a present position detecting device for detecting a present position of the communication apparatus and outputting present position information indicative of the detected present position. The communication apparatus is also provided with an identification information obtaining device for obtaining identification information of respective one of the base stations on the basis of the present position information outputted by the present position detecting device. The communication apparatus is further provided with a specifying device for specifying said one base station on the basis of the identification information obtained by the identification information obtaining device.

8 Claims, 5 Drawing Sheets

COMMUNICATION APPARATUS AND COMMUNICATION METHOD

BACKGROUND OF THE INVENTION

1. Field of the Invention

The present invention relates to a communication apparatus for receiving a plurality of signals from a plurality of base stations respectively and selecting one of them, which is the most suitable base station, to thereby communicate with the selected one.

2. Description of the Related Art

There is a communication apparatus adopting a CDMA (Code Division Multiple Access) method. By this CDMA method, the transmission signal is narrow-band-modulated and is further spread-spectrum-modulated by using a spread code series, to be thereby transmitted as a communication signal having a wide band. By performing such a spread spectrum modulation, it is possible to improve the capability of eliminating a disturbance wave and an interference wave, as compared with an ordinary narrow band modulating method. Further, by performing the spread spectrum modulation using the different spread code series for each user, a large number of users can commonly use the same frequency band to communicate with the other party. Namely, a so-called multiple access is enabled. Because such an advantageous feature is appreciated, the CDMA method is remarked as a basic technique for the movable body communication system in the next generation.

By the way, in the field of the movable body communication system adopting the CDMA method which has been already engaged in the business e.g., in the field of the portable telephone, such a system structure is employed that a large number of base stations, which are wire-line-connected to a communication line controlling station, are constructed to be distributed for each area (service area) and that a wireless communication is performed between the communication apparatus (portable telephone), which each user possesses, and each base station. By automatically detecting the closest base station to the portable telephone of each user from among the large number of base stations and then by communicating with the detected base station, it is possible to establish a good communication even if each user is moving.

In order to automatically detect the closest base station, the portable telephone may have a receiving circuit as shown in FIG. 5, for example.

In FIG. 5, in order to establish an asynchronous communication between the portable telephone and a certain base station among a large number of base stations, respective one of the base stations is identified by a downstream scramble code. The total number of scramble codes usable here is 512. Those 512 scramble codes are divided into 32 groups, and the number of the scramble codes in each group is 16 (since 512 [codes] is divided by 32 [groups], 512÷32= 16 [codes]). By using this group division, a cell search is performed.

Each base station spread-spectrum-modulates and transmits the assigned scramble code group identification short code and the scramble code. This transmitted electric wave is received by the portable telephone, so that it is possible to detect from which base station the received electric wave is.

In the receiving circuit show in FIG. 5, an electric wave from a base station is received by an antenna 1, and a reception signal thereof is amplified by an RF (Radio Frequency) circuit 2 and is supplied to multipliers 3 and 4. To the multiplier 3, a code series for inverse-spreading, which is generated by a spread series generator 6, is supplied. To the multiplier 4, a code series for inverse-spreading, a phase of which is shifted by $\pi/2$ by a phase shift circuit 5, is supplied.

An inverse-spreading circuit is constituted by the multipliers 3 and 4, the phase shift circuit 5 and the spread series generator 6. The in-phase component (I component) generated by the multiplier 3 and the orthogonal component (Q component) generated by the multiplier 4 are supplied through low pass filters 7 and 8 respectively to a correlation calculating circuit and a complex matched filter 11.

The complex matched filter 11 detects the I component and the Q component supplied from the low pass filters 7 and 8. A scramble code synchronous detecting circuit 12 synchronous-detects (or synchronous-captures) the scramble code on the basis of this wave component detection result. Further, a scramble code group ID detecting circuit 13 detects the scramble code group identification short code IDn of the base station, on the basis of this synchronous detection result.

Namely, as the scramble code synchronous detecting circuit 12 performs the synchronous-detection as mentioned above, one scramble code group identification short code IDn is generated from among 32 scramble code group identification short codes ID1 to ID32. The scramble code group ID detecting circuit 13 detects the group, to which the base station belongs, on the basis of this scramble code group identification short code IDn.

A scramble code generating circuit 14 sequentially generates 16 scramble codes CODE1 to CODE16, which belong to this detected scramble code group identification short code IDn, and supplies them to the correlation operating circuit 9.

The correlation operating circuit 9 obtains the correlation between (i) the scramble code CODEm and (ii) the I component and the Q component from the low pass filters 7 and 8 respectively, each time when the scramble code CODEm among the 16 scramble codes CODE1 to CODE16 is supplied from the scramble code generating circuit 14, and supplies the correlation value Rm obtained by this correlating operation, to a scramble judging circuit 15. Through the correlation operating circuit 9, the I component and the Q component are supplied to a phase correcting circuit 10, so that the decoding process is performed by the phase correcting circuit 10 and finally a reception output is generated.

The scramble code judging circuit 15 judges that the identification of the base station (e.g., the synchronous capture) is completed if the correlation value Rm reaches or exceeds a predetermined threshold value THD while comparing the correlation value Rm with the threshold value THD. Then, the data communication or voice communication by using the pertinent receiving circuit is started. On the other hand, the scramble code judging circuit 15 judges that an appropriate base station is not detected if the correlation value Rm does not reach the threshold value THD. Then, the scramble code synchronous detecting circuit 12 performs the synchronous detection again, and the processes of synchronous-capturing as described above are repeatedly performed until the base station is identified.

However, in the above described communication apparatus, by detecting the scramble code group identification short code IDn from the received electric wave, the groups are narrowed down to one group, to which the base station transmits this electric wave belongs. Further, by selecting one scramble code CODEm belonging to this one group, the closest base station is identified.

Accordingly, it takes a long time period to search the closest base station. Namely, in addition to the requirement of selecting the scramble code group, it is necessary to repeat the above mentioned various processes, 16 times at the maximum in order to select one scramble code CODEm from among the 16 scramble codes CODE1 to CODE16, even after the group identification short code IDn is detected.

SUMMARY OF THE INVENTION

It is therefore an object of the present invention to provide a communication apparatus and a communication method, which can speedily specify an appropriate base station from among a plurality of base stations.

The above object of the present invention can be achieved by a communication apparatus for communicating with one base station among a plurality of base stations. The communication apparatus is provided with: a present position detecting device for detecting a present position of the communication apparatus and outputting present position information indicative of the detected present position; an identification information obtaining device for obtaining identification information of respective one of the base stations on the basis of the present position information outputted by the present position detecting device; and a specifying device for specifying said one base station on the basis of the identification information obtained by the identification information obtaining device.

According to the communication apparatus of the present invention, the present position of the communication apparatus is detected by the present position detecting device, and the present position information is outputted. Then, the identification information of respective one of the base stations is obtained by the identification information obtaining device, on the basis of the present position information outputted by the present position detecting device. Finally, said one base station (i.e., the base station with which an appropriate receiving condition can be obtained) is specified by the specifying device, on the basis of the identification information obtained by the identification information obtaining device.

For example, one or a plurality of identification information of one or a plurality of base stations located close to the present position are obtained by the identification information obtaining device, on the basis of the present position information generated in advance by the present position detecting device. Then, an actual communication is tentatively performed on the basis of the identification information. At this time, if an appropriate receiving condition is obtained, the base station corresponding to the identification information when the appropriate receiving condition is obtained is specified as the appropriate base station by the specifying device.

In this manner, since the present position is detected in advance, it is possible to specify the base station, with which an appropriate communication can be established, for a relatively short time period.

In one aspect of the communication apparatus of the present invention, the identification information obtaining device includes a memory device for storing a plurality of position information of the base stations and the identification information in correlation with each other, to thereby obtain the identification information corresponding to the present position information from the identification information stored in the memory device.

According to this aspect, the identification information corresponding to the present position information is obtained from the identification information stored in the memory device, in which a plurality of position information of the base stations and the identification information are stored in correlation with each other. Thus, it is possible to specify the base station for a relatively short time period.

In this aspect, the memory device may further store category information to categorize the plurality of position information of the base stations respectively into a plurality of groups. The identification information obtaining device may obtain the category information of said one base station on the basis of the present position information, and may obtain the identification information on the basis of the obtained category information.

By constituting in this manner, by the identification information obtaining device, the category information of said one base station is firstly obtained on the basis of the present position information, and then, the identification information is obtained on the basis of the obtained category information. Thus, it is possible to specify the base station for a relatively short time period.

In another aspect of the communication apparatus of the present invention, the identification information obtaining device obtains one or a plurality of identification information corresponding to one or a plurality of base stations close to the present position on the basis of the present position information. The specifying device specifies said one base station by selecting one identification information from among one or a plurality of identification information corresponding to one or a plurality of base stations close to the present position.

According to this aspect, one or a plurality of identification information corresponding to one or a plurality of base stations close to the present position (e.g., the closest base station, the second closest base station, the third closest base station and so on) are obtained on the basis of the present position information. Then, one identification information is selected from among one or a plurality of identification information corresponding to those base stations, to thereby specify said one base station. Thus, it is possible to specify the base station for a relatively short time period.

The above object of the present invention can be also achieved by a communication method of communicating with one base station among a plurality of base stations. The communication method is provided with: a present position detecting process of detecting a present position of the communication apparatus and outputting present position information indicative of the detected present position; an identification information obtaining process of obtaining identification information of respective one of the base stations on the basis of the present position information outputted by the present position detecting process; and a specifying process of specifying said one base station on the basis of the identification information obtained by the identification information obtaining process.

According to the communication method of the present invention, the present position of the communication apparatus is detected by the present position detecting process, and the present position information is outputted. Then, the identification information of respective one of the base stations is obtained by the identification information obtaining process, on the basis of the present position information outputted by the present position detecting process. Finally, said one base station (i.e., the base station with which an appropriate receiving condition can be obtained) is specified by the specifying process, on the basis of the identification information obtained by the identification information obtaining process.

In this manner, since the present position is detected in advance, it is possible to specify the base station, with which an appropriate communication can be established, for a relatively short time period.

In one aspect of the communication method of the present invention, the identification information obtaining process includes a storing process of storing a plurality of position information of the base stations and the identification information in correlation with each other into a memory device, to thereby obtain the identification information corresponding to the present position information from the identification information stored in the memory device.

According to this aspect, the identification information corresponding to the present position information is obtained from the identification information stored in the memory device, in which a plurality of position information of the base stations and the identification information are stored in correlation with each other. Thus, it is possible to specify the base station for a relatively short time period.

In this aspect, the storing process may further store into the memory device category information to categorize the plurality of position information of the base stations respectively into a plurality of groups. The identification information obtaining process may obtain the category information of said one base station on the basis of the present position information, and may obtain the identification information on the basis of the obtained category information.

By constituting in this manner, by the identification information obtaining process, the category information of said one base station is firstly obtained on the basis of the present position information, and then, the identification information is obtained on the basis of the obtained category information. Thus, it is possible to specify the base station for a relatively short time period.

In another aspect of the communication method of the present invention, the identification information obtaining process obtains one or a plurality of identification information corresponding to one or a plurality of base stations close to the present position on the basis of the present position information. The specifying process specifies said one base station by selecting one identification information from among one or a plurality of identification information corresponding to one or a plurality of base stations close to the present position.

According to this aspect, one or a plurality of identification information corresponding to one or a plurality of base stations close to the present position are obtained on the basis of the present position information. Then, one identification information is selected from among one or a plurality of identification information corresponding to those base stations, to thereby specify said one base station. Thus, it is possible to specify the base station for a relatively short time period.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Figure 1:
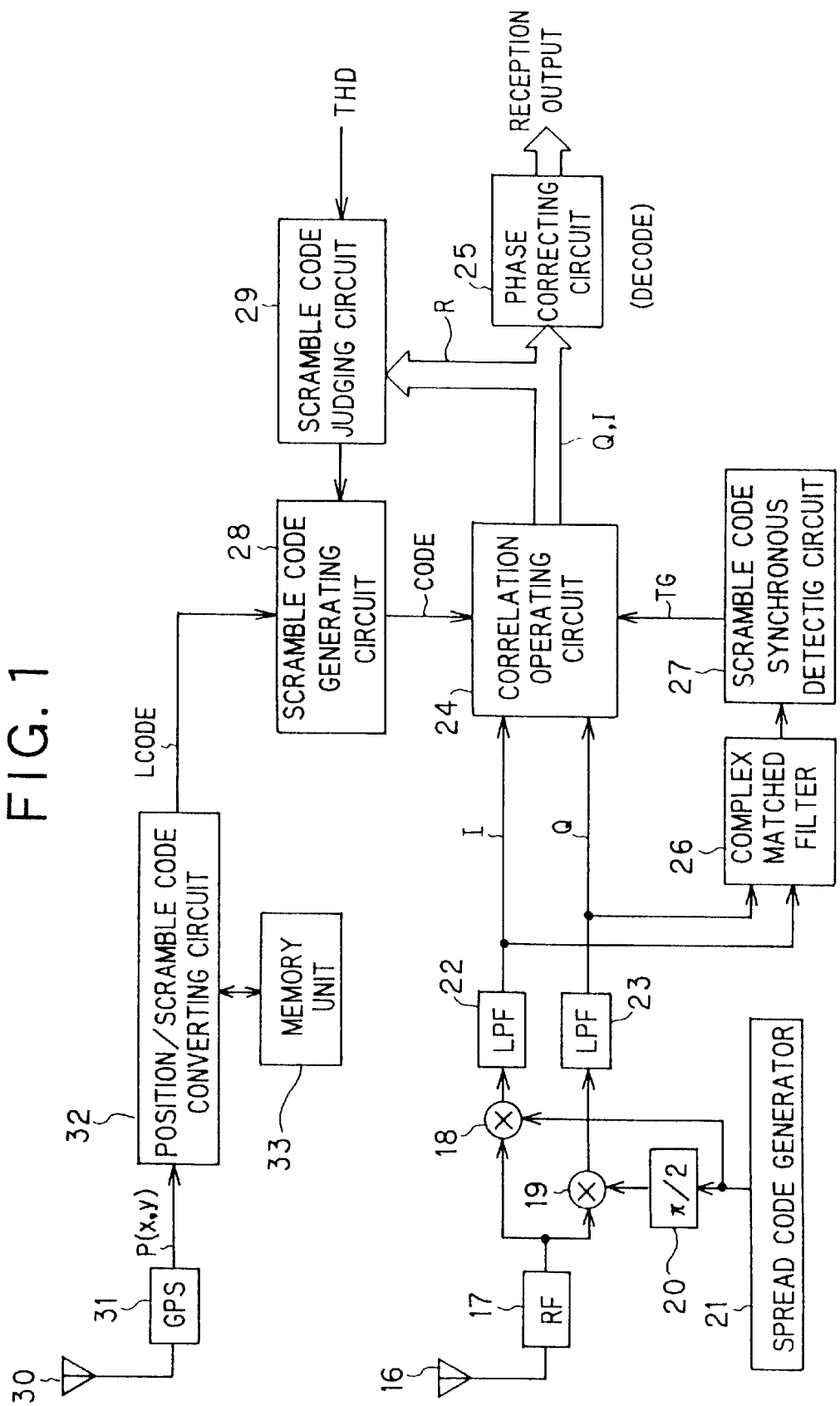
FIG. 1 is a block diagram showing a structure of a portable telephone as an embodiment of the present invention.

Referring to the accompanying drawings, an embodiment of the present invention will be now explained. In the present embodiment, the present invention is applied to a communication apparatus using the CDMA communication method. FIG. 1 is a block diagram showing a structure of a portable telephone terminal as an embodiment of the communication apparatus of the present invention.

In FIG. 1, the portable telephone terminal is provided with a first receiving portion for receiving an electric wave from a base station, and a second receiving portion for measuring a present position by receiving an electric wave from a GPS (Global Positioning System) satellite.

The first receiving portion is provided with: an antenna 16; an RF circuit 17; multipliers 18 and 19; a phase shift circuit 20; a spread series generator 21: low pass filters 22 and 23; a correlation operating circuit 24; a phase correcting circuit 25; a complex matched filter 26; a scramble code synchronous detecting circuit 27; a scramble code generating circuit 28; and a scramble code judging circuit 29.

The second receiving portion is provided with: an antenna 30; a GPS receiving circuit 31; a position/scramble code converting circuit; and a memory unit 33.

In the first receiving circuit, the antenna 16 receives the electric wave from the base station. The RF circuit 17 amplifies a reception signal of the antenna 16 and supplies it to the multipliers 18 and 19.

The multiplier 18 multiplies a code series for inverse-spreading, which is generated by the spread series generator 21, by the amplified reception signal from the RF circuit 17. Then, the output signal of the multiplier 18 is passed through the low pass filter 22, so that a base band signal having an in-phase component (I component) is generated.

The multiplier 19 multiplies a code series for inverse-spreading, which is generated by the spread series generator 21 and is then phase-shifted by $\pi/2$ by the phase shift circuit 20, by the amplified reception signal from the RF circuit 17. Then, the output signal of the multiplier 19 is passed through the low pass filter 23, so that a base band signal having an orthogonal phase component (Q component) is generated.

The complex matched filter 26 detects the I component and the Q component. The scramble code synchronous detecting circuit 27 synchronous-detects a reception timing of a scramble code from the wave detection result of the complex matched filter 26, and supplies a synchronous detection result TG thereof to the correlation operating circuit 24.

The correlation operating circuit 24 obtains a correlation between (i) the scramble code CODE supplied from the scramble code generating circuit 28 and (ii) the I component and the Q component, and supplies the obtained correlation value R to the scramble code judging circuit 29.

The I component and the Q component are supplied to the phase correcting circuit 25 through the correlation operating circuit 24. The phase correcting circuit 25 performs a decoding process to thereby output a reception output.

On the other hand, in the second receiving portion, the electric wave from the GPS satellite is received by the antenna 30. Then, the GPS receiving circuit 31 decodes a reception signal of the antenna 30 to thereby generate a present position data P(x, y) indicating a present position (longitude x and latitude y) of the portable telephone terminal and output it. Namely, the GPS receiving circuit 31 is one example of a present position detecting device for detecting the present position.

The position/scramble code converting circuit 32 searches 3 base stations, which are located at the closest to the pertinent portable telephone terminal, on the basis of the present position data P(x, y) from the GPS receiving circuit 31, and outputs scramble code pattern data LCODE to generate a scramble code CODE assigned to respective one of the base stations.

Figure 2:
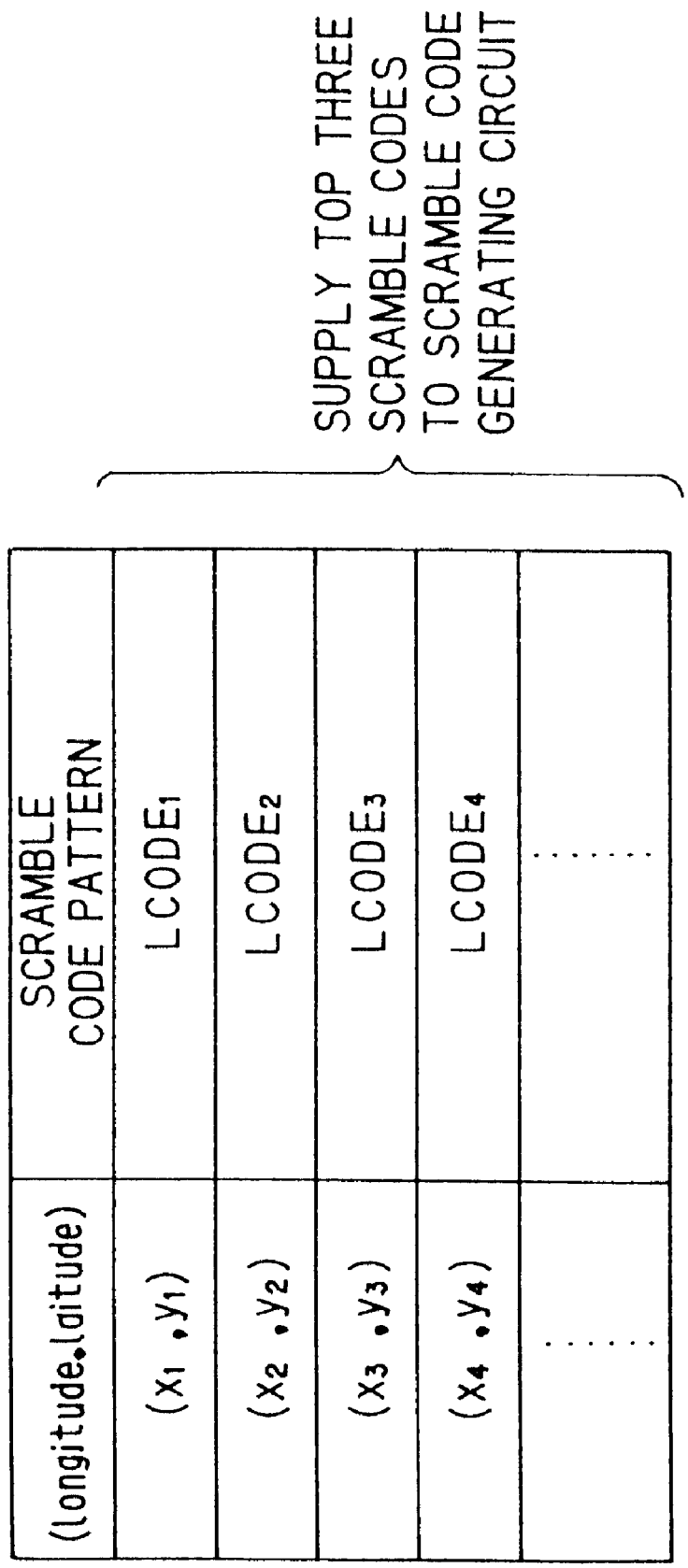
FIG. 2 is a diagram showing a memory map of a memory unit in the embodiment.

As shown in a memory map of FIG. 2, the memory unit 33 stores the scramble code pattern data LCODE1, LCODE2, LCODE3, . . . assigned to the respective base stations, and the position data (x1, y1), the position data (x2, y2), the position data (x3, y3), . . . indicative of respective positions of all the base stations, which are, known and registered according to a rule or regulation in advance, in correlation with each other.

Namely, the position/scramble code converting circuit 32 is one example of an identification information obtaining device for obtaining the identification information indicative of the closest base station or stations, on the basis of the present position information obtained by the GPS receiving circuit 31. The position/scramble code converting circuit searches three position data of the three closest base stations from among the position data (x1, y1), the position data (x2, y2), the position data (x3, y3) . . . by using the present position data P(x, y) as a reference. Further, the position/scramble code converting circuit 32 selects three scramble code, pattern data LCODE corresponding to the searched three position data from among the scramble code pattern data LCODE1, LCODE2, LCODE3, . . . , and supplies those selected three scramble code pattern data LCODE separately for "the (first) closest base station", "the second closest base station" and "the third closest base station", to the scramble code generating device.

The scramble code generating circuit 28 has three buffer registers (not illustrated) to which priority orders are respectively given. The scramble code pattern data (which is referred to as "LCODEf" hereinafter) corresponding to the above mentioned "(first) closest base station" is stored in the buffer register for the likeliest candidate of the base station. The scramble code pattern data (which is referred to as "LCODEs" hereinafter) corresponding to the above mentioned "second closest base station" is stored in the buffer register for the next candidate of the base station. The scramble code pattern data (which is referred to as "LCODEt" hereinafter) corresponding to the above mentioned "third closest base station" is stored in the buffer register for the last candidate of the base station.

Further, the scramble code generating circuit 28 has an oscillator (not illustrated) for generating the scramble code CODE composed of a code series, on the basis of the supplied scramble code pattern data, when the scramble code pattern data LCODEf, LOC,DEs or LCODEt stored in the buffer register is supplied to the scramble code generating circuit 28.

Then, the scramble code CODE generated by the oscillator of the scramble code generating circuit 28 is supplied to the correlation operating circuit 24, which obtains the correlation between (i) the scramble code CODE and (ii) the I component and the Q component, in synchronization with the synchronous detection result TG supplied from the scramble code synchronous detecting circuit 27, and supplies the obtained correlation value R to the scramble code judging circuit 29.

The scramble code judging circuit 29 compares the correlation value R and the predetermined threshold value THD. If the correlation value R reaches or exceeds the threshold value THD, the scramble code judging circuit 29 judges that the selection (synchronous capture) of the base station is completed, so that the data communication, the voice communication or the like is started by the pertinent portable telephone terminal.

On the other hand, if the correlation value R does not reach the threshold value THD, the scramble code judging circuit 29 judges that the appropriate base station cannot be selected. Then, the scramble code judging circuit 29 controls the scramble code generating circuit 28 to generate the next scramble code CODE, and repeats those processes until the correlation value R generated as the result reaches or exceeds the threshold value THD.

Namely, firstly, the scramble code generating circuit 28 generate the scramble code CODE on the basis of the scramble code pattern data LCODEf corresponding to "the (first) closest base station" stored in the buffer register of the likeliest candidate. Then, if the correlation value R generated as the result does not reach the threshold value THD, the scramble code judging circuit 29 controls the scramble code generating circuit 28 to generate the scramble code CODE on the basis of the scramble code pattern data LCODEs corresponding to "the second closest base station" stored in the buffer register of the next candidate.

Further, if, as a result of the generation of the scramble code CODE based on the scramble code pattern data LCODEs corresponding to "the third closest base station", the correlation value R does not reach the threshold value THD, the scramble code judging circuit 29 controls the scramble code generating circuit 28 to generate the scramble code CODE on the basis of the scramble code pattern data LCODEt corresponding to "the third closest base station" stored in the buffer register of the last candidate.

In this manner, the scramble code judging circuit 29 compares the correlation value R generated by the correlation operating circuit 9 with the threshold value THD, to thereby judge whether or not the base station is appropriate, and controls the scramble code generating circuit 28 to switch to the respective scramble code CODEs corresponding to the scramble code pattern data LCODEf, LCODEs and LCODEt in accordance with the priority order, until the appropriate base station is selected.

In case that none of the correlation values R generated by the correlation operating circuit 9 reaches the threshold value THD even if switching to the scramble codes CODE corresponding to the scramble code pattern data LCODEf, LCODEs and LCODEt, the scramble code judging circuit 29 controls the GPS receiving circuit 31, the position/scramble code converting circuit 32 and the memory unit!33 to perform the measurement of the present position again.

Then, the scramble code generating circuit 28 generates the scramble codes CODE for the respective scramble code pattern data LCODEf, LCODEs and LCODEt newly obtained, in the order in accordance with the judgment result of the scramble code judging circuit 29. Also, as the scramble code judging circuit 29 performs the above mentioned comparison and judgment of the correlation value R and the threshold value THD, the base station by which the appropriate receiving condition can be established is selected.

Next, one example of the operation of selecting the base station by the portable telephone terminal of the present embodiment is explained with reference to a flowchart of FIG. 3.

Figure 3:
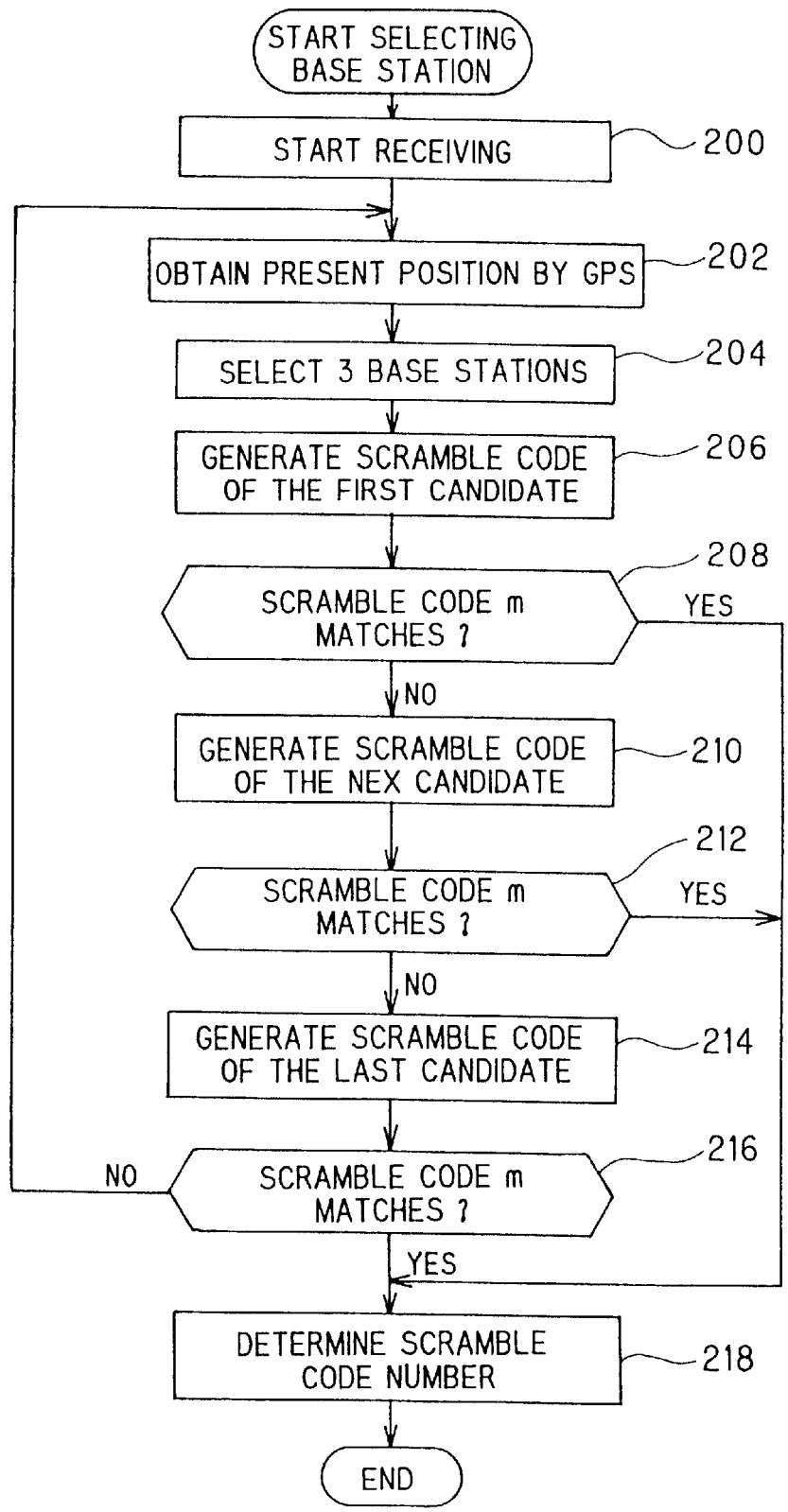
FIG. 3 is a flowchart showing an operation of selecting a base station in the embodiment.

In FIG. 3, when the main power of the portable telephone terminal is turned on, the process of selecting the base station is started, and the first and second receiving portions start receiving the electric waves respectively (step S200).

Then, the GPS receiving circuit 31 measures the present position of the portable telephone terminal (step S202).

Figure 4:
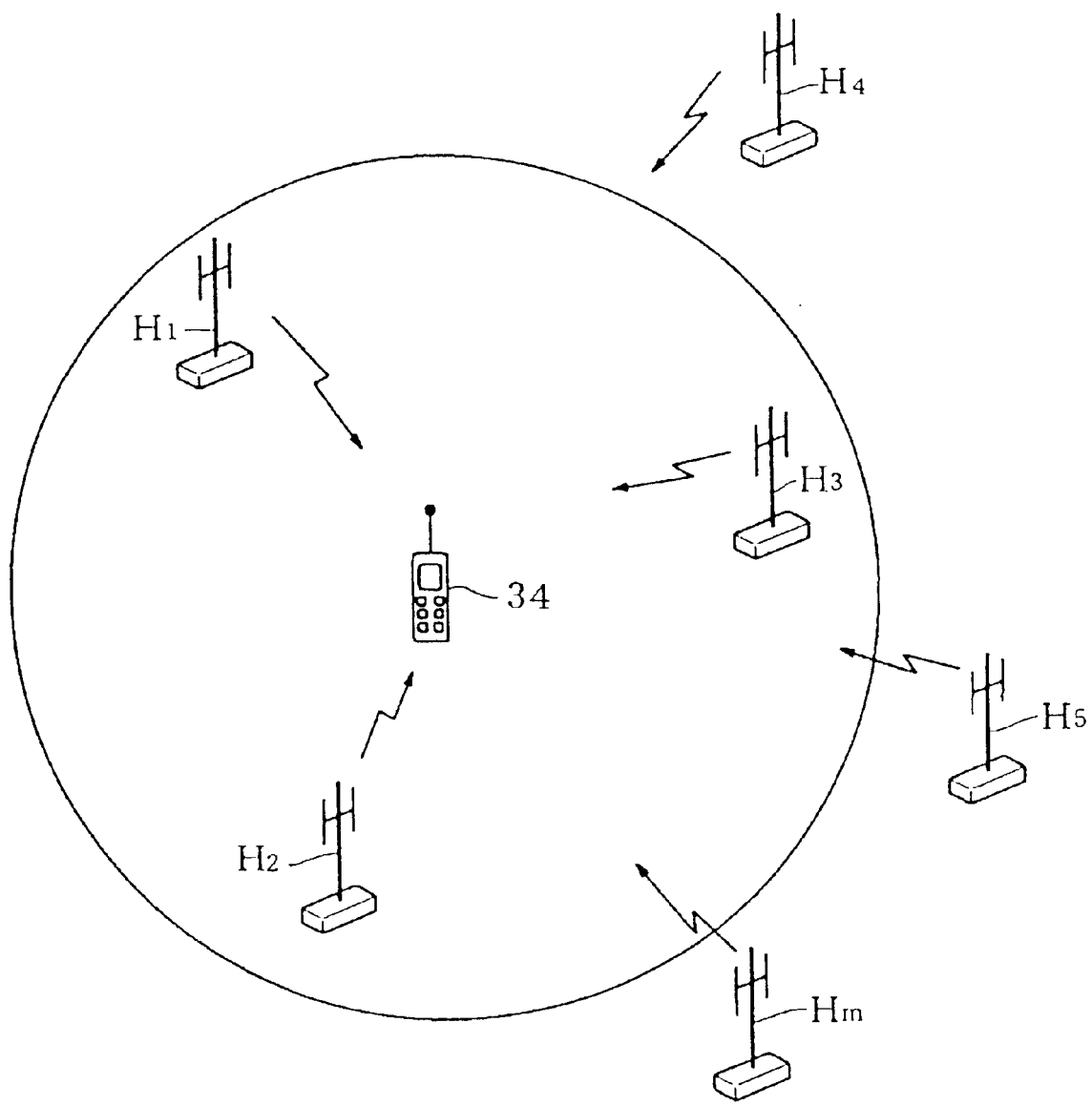
FIG. 4 is a conceptual diagram for explaining a method of selecting base station candidates.
Figure 5:
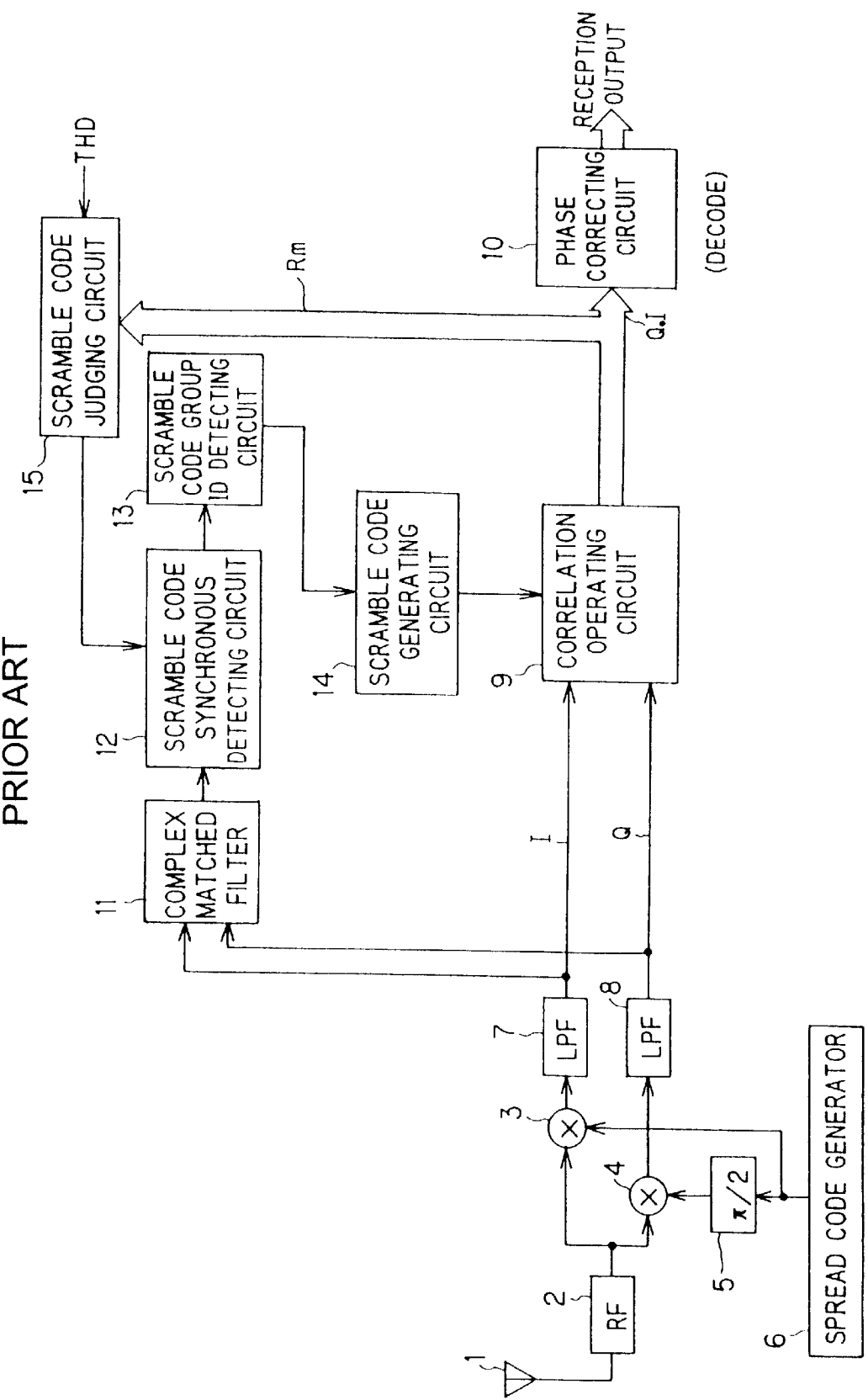
FIG. 5 is a block diagram showing a structure of a portable telephone according to a related art.

Then, the position/scramble code converting circuit 32 searches the base station which is the closest to the present position as the likeliest candidate, the base station which is the second closest to the present position as the next candidate, and the base station which is the third closest to the present position as the last candidate, from the memory unit 33 (step S204). For example, as shown in FIG. 4, if there are a plurality of base stations H1 to Hm around the pertinent portable telephone terminal, three base stations H1, H2 and H3 which are the closest to the present position are selected as the likely candidates, from among those base stations H1 to Hm. Further, the position data of the base stations H1, H2 and H3 are searched. Furthermore, the scramble code pattern data LCODE corresponding to the respective position data are supplied to the scramble code generating circuit 28 as the LCODEf, LCODEs and LCODEt.

Then, the scramble code CODE is generated on the basis of the scramble code pattern data LCODEf of the (first) closest base station (i.e., the likeliest candidate), and is supplied to the correlation operating circuit 24 (step S206).

Then, the scramble code judging circuit 29 compares the correlation value R generated by the correlation operating circuit 24 and the threshold value THD, and judges whether or not the scramble code CODE matches with the appropriate receiving condition (step S208). If it matches with the appropriate receiving condition (step S208: YES), the operation flow branches to a step S218. Then, the scramble code CODE number is determined (step S218) and the operation of selecting the base station is ended. On the other hand, if it does not match with the appropriate receiving condition (step S208: NO), the operation flow proceeds to a step S210.

Then, the scramble code CODE is generated on the basis of the scramble code pattern LCODEs of the second closest base station (i.e., the next candidate) and is supplied to the correlation operating circuit 24 (step S210).

Then, the scramble judging circuit 29 compares the correlation value R generated by the correlation operating circuit 29 and the threshold value THD, and judges whether or not the scramble code CODE matches with the appropriate receiving condition (step S212). If it matches with the appropriate receiving condition (step S212: YES), the operation flow branches to the step S218. Then, the scramble code CODE number is determined (step S218) and the operation of selecting the base station is ended. On the other hand, if it does not match with the appropriate receiving condition (step S212: NO), the operation flow proceeds to a step S214.

Then, the scramble code CODE is generated on the basis of the scramble code pattern LCODEt of the third closest base station (i.e., the last candidate) and is supplied to the correlation operating circuit 24 (step S214).

Then, the scramble judging circuit 29 compares the correlation value R generated by the correlation operating circuit 29 and the threshold value THD, and judges whether or not the scramble code CODE matches with the appropriate receiving condition (step S216). If it matches with the appropriate receiving condition (step S216: YES), the operation flow branches to the step S218. Then, the scramble code CODE number is determined (step S218) and the operation of selecting the base station is ended. On the other hand, if it does not match with the appropriate receiving condition (step S216: NO), the operation flow returns to the step S202, so as to repeat the processes from the step S202.

In this manner, according to the present embodiment, the present position of the portable telephone terminal is measured by receiving the electric wave from the GPS satellite. Then, three closest base stations are selected as the candidates. By evaluating the scramble codes of those three base station as the candidates, the base station by which the appropriate receiving condition can be obtained is selected. Thus, it is possible to reduce the time period required to perform the operation of selecting the base station.

Namely, according to the related art, the probability that the scramble code of one appropriate base station can be obtained from among the 512 kinds of scramble codes is 1/512. In contrast, according to the present embodiment, since three base stations of the likely candidates are selected in advance, and then, one appropriate base station is selected from among the three, the probability that the scramble code of one appropriate base station can be obtained is 1/3. Further, since the evaluation of the scramble code is performed in the order from the likeliest candidate i.e., the (first) closest base station, the actual probability is higher than 1/3. As a result, according to the present embodiment, it is possible to drastically reduce the time period required to perform the operation of selecting the base station.

Incidentally, although three closest base stations among the large number of base stations are selected as the candidates in the present embodiment, the number of the candidates is not limited to three. For example, just one closest base station may be selected as a candidate, and if the receiving condition with this closest base station is not appropriate, the closest one base station may be selected again as a candidate by receiving the electric wave from the GPS; so that the same operation of selecting the base station may be repeated until an appropriate receiving condition can be obtained. Alternatively, two closest base stations may be selected as candidates, or four or more closest base stations may be selected as candidates, as long as the base stations in the number less than the maximum number of the scramble codes set in advance are selected as candidates. Further, it is preferable not to increase the number of the base stations as candidates thoughtlessly, but to set the appropriate number of the base stations as candidates in consideration with the relationship with the time period required to perform the operation of selecting the base station.

In the present embodiment, the scramble code which is the identification information of the base station is directly generated, and the base station appropriate for the communication is selected. However, the present invention is not limited to this. For example, the scramble code group identification short code as category information may be also stored in the memory unit 33, and the scramble code patterns of a plurality of base station as candidates may be determined on the basis of the searched scramble code group identification short code, after the position/scramble code converting circuit 32 searches the scramble code group identification short code of the closest base station on the basis of the present position data P (x, y) obtained by receiving the electric wave from the GPS satellite.

In the present embodiment, the present position is measured by receiving the electric wave from the GPS satellite. However, the present invention is not limited to this. For example, by installing an earth magnetic sensor, an azimuth sensor and the like to the portable telephone terminal, the present position may be measured on the basis of a detection output of those sensors.

In the present embodiment, the CDMA method using the DS (Direct Sequence) method is explained. However, the present invention is not limited to this. For example, the CDMA method using the FH (Frequency Hopping) method may be employed.

In the present embodiment, the present invention is applied to the CDMA method. However, the present invention can be applied to the FDMA method or the TDMA method.

In the present embodiment, the present invention is applied to the movable body communication system, especially the portable telephone system of wireless type. However, the present invention can be applied to any communication field regardless of a wireless communication or a wire communication. For example, the present invention can be applied to an optical LAN (Local Area Network) using an optical fiber as a transmission path, a wireless LAN performing the communication by transmitting an optical signal in the air, and the like.

The present invention can be applied to a digital communication and an analog communication. Further, in the present embodiment, the case that the PSK (Phase Shift Keying) modulated signal is received is explained, the present invention can be applied to the ASK (Amplitude Shift Keying) method, the OOK (On-Off shift Keying) method, the FSK (Frequency Shift Keying) method or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-233417 filed on Aug. 20, 1999 including the specification, claims, drawings and summary is incorporated herein by reference in its entirety.

What is claimed is:

1. A communication apparatus for communicating with one base station among a plurality of base stations, comprising:

a present position detecting device for detecting a present position of said communication apparatus and outputting present position information indicative of the detected present position;

an identification information obtaining device for obtaining identification information of respective one of the base stations on the basis of the present position information outputted by said present position detecting device; and a specifying device for specifying said one base station on the basis of the identification information obtained by said identification information obtaining device.

2. A communication apparatus according to claim 1, wherein said identification information obtaining device comprises a memory device for storing a plurality of position information of the base stations and the identification information in correlation with each other, to thereby obtain the identification information corresponding to the present position information from the identification information stored in said memory device.

3. A communication apparatus according to claim 2, wherein said memory device further stores category information to categorize the plurality of position information of the base stations respectively into a plurality of groups, and said identification information obtaining device obtains the category information of said one base station on the basis of the present position information, and obtains the identification information on the basis of the obtained category information.

4. A communication apparatus according to claim 1, wherein said identification information obtaining device obtains one or a plurality of identification information corresponding to one or a plurality of base stations close to the present position on the basis of the present position information, and said specifying device specifies said one base station by selecting one identification information from among one or a plurality of identification information corresponding to one or a plurality of base stations close to the present position.

5. A communication method of communicating with one base station among a plurality of base stations, comprising:

a present position detecting process of detecting a present position of said communication apparatus and outputting present position information indicative of the detected present position;

an identification information obtaining process of obtaining identification information of respective one of the base stations on the basis of the present position information outputted by said present position detecting process; and a specifying process of specifying said one base station on the basis of the identification information obtained by said identification information obtaining process.

6. A communication method according to claim 5, wherein said identification information obtaining process comprises a storing process of storing a plurality of position information of the base stations and the identification information in correlation with each other into a memory device, to thereby obtain the identification information corresponding to the present position information from the identification information stored in said memory device.

7. A communication method according to claim 6, wherein said storing process further stores into said memory device category information to categorize the plurality of position information of the base stations respectively into a plurality of groups, and said identification information obtaining process obtains the category information of said one base station on the basis of the present position information, and obtains the identification information on the basis of the obtained category information.

8. A communication method according to claim 5, wherein
said identification information obtaining process obtains one or a plurality of identification information corresponding to one or a plurality of base stations close to the present position on the basis of the present position information, and
said specifying process specifies said one base station by selecting one identification information from among one or a plurality of identification information corresponding to one or a plurality of base stations close to the present position.

* * * * *